Figure 1:
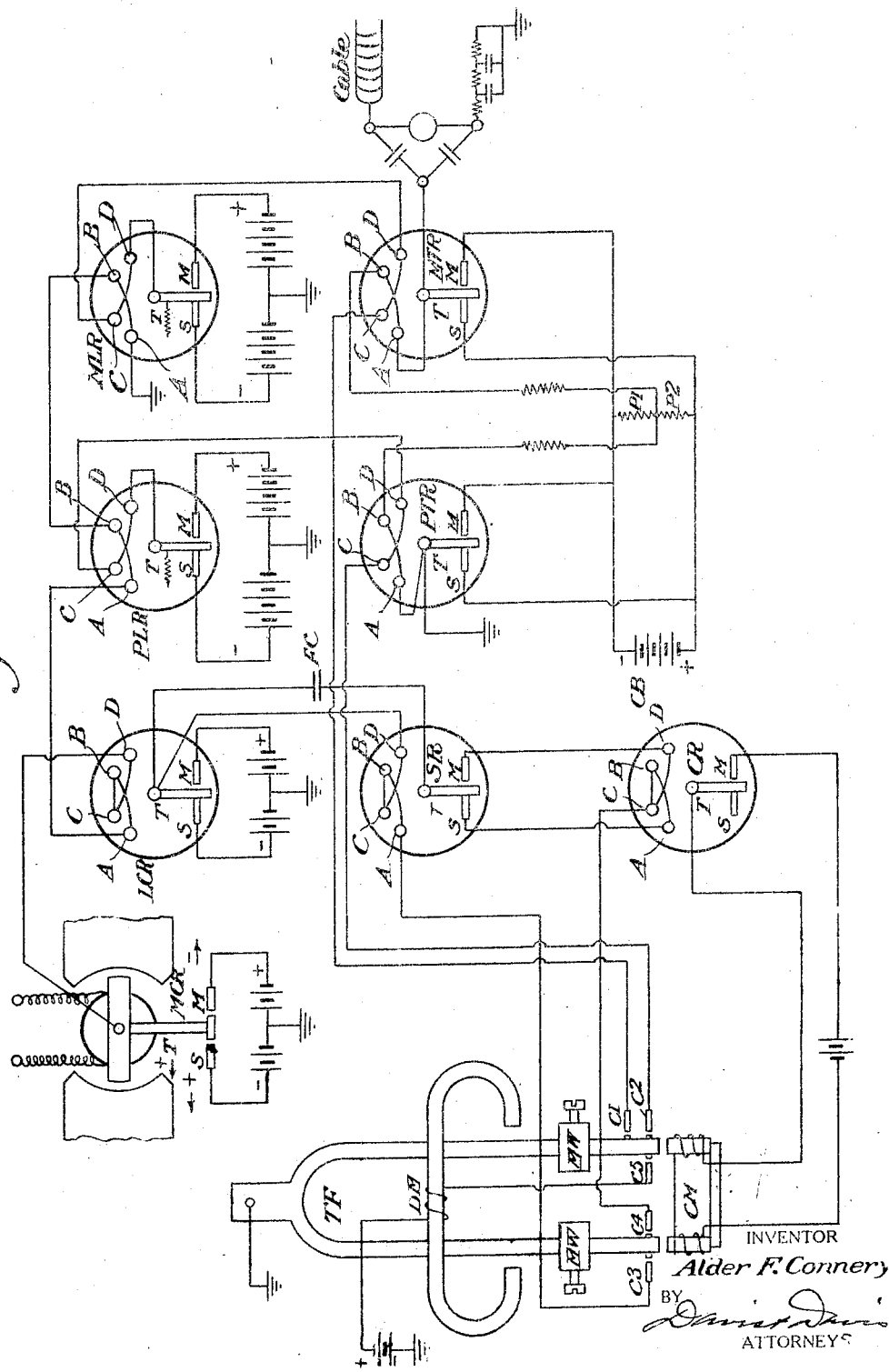

INVENTOR
*Alder F. Connery.*
BY
ATTORNEYS.

Patented June 23, 1925.

1,542,860

UNITED STATES PATENT OFFICE.

ALDER F. CONNERY, OF JAMAICA, NEW YORK, ASSIGNOR OF ONE-HALF TO THE COMMERCIAL CABLE COMPANY, OF NEW YORK, N. Y., A CORPORATION OF NEW YORK.

CABLE TELEGRAPHY.

Application filed April 17, 1924. Serial No. 707,154.

*To all whom it may concern:*

Be it known that I, ALDER F. CONNERY, a subject of the King of Great Britain, and a resident of Jamaica, in the county of Queens and State of New York, have invented certain new and useful Improvements in Cable Telegraphy, of which the following is a specification.

In my application for patent, Serial No. 667,056, filed October 6, 1923, I have described a regenerative vibratory repeater for telegraph circuits. The apparatus therein described may be used in connection with submarine cables and will repeat in perfect form positive and negative signals. It will not, however, repeat zero signals.

The usual practice on submarine cables of high electrostatic capacity is to use positive, negative and zero current values in the transmission of signals. When it is desired to repeat automatically the signals from one cable section into another the received signals operate a moving coil relay. The moving coil relay in turn controls transmitting relays which relays in turn control the currents applied to the next section of cable. The repeated signals are not as a rule as perfectly formed as the signals which were originally transmitted. Defects in the adjustment of the apparatus or imperfections in the duplex balance may cause the repeated signals to be improperly formed.

The main object of my invention is to provide a regenerative vibratory repeater capable of dealing with positive, negative and zero signals and to provide means whereby said repeater will vibrate in synchronism with the signals as sent out by the transmitting apparatus. The repeated signals from the repeater herein described will be perfect in form even though the signals were received in considerably distorted condition.

Another important object of the invention is to provide means whereby the received signals will operate the means for maintaining the repeater in synchronism with the signals transmitted from the sending apparatus.

Figure 2:
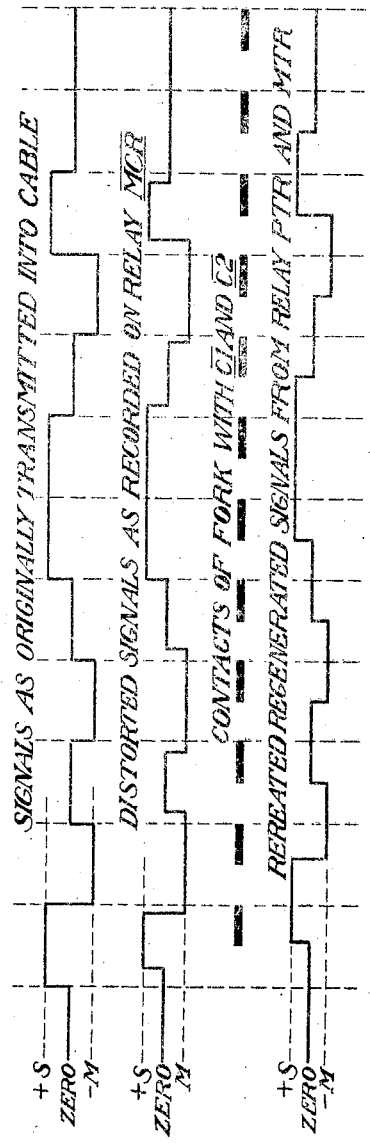
Figure 3:
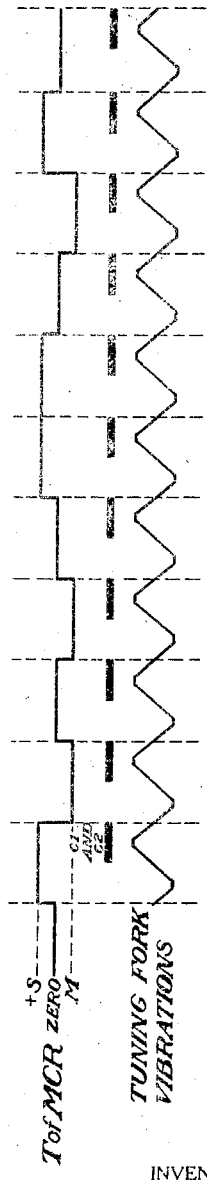

In the drawings,

Figure 1 is a diagrammatic view of an apparatus for carrying out the invention and includes a moving coil relay of a cable receiving apparatus and a regenerative repeater set operated from the moving coil relay;

Fig. 2 a diagrammatic view showing graphically the regenerative action of the repeater; and Fig. 3 a diagrammatic view illustrating graphically the synchronous movement of the vibrating element and the signal units.

Referring to Fig. 1, MCR designates a moving coil receiving relay. It is assumed that this relay will be actuated in the usual manner by the signals received over a cable, the signals originally being transmitted by an automatic cable transmitter of any approved and usual form. A positive current will cause the tongue of relay MCR to touch its contact S and a negative current will cause its tongue to touch contact M. Zero or no current will cause the tongue to remain in a central position engaging with neither contact.

In Fig. 1, LCR designates a line-control relay, SR designates a switch relay, CR designates a corrector relay, PLR and MLR designate a plus locking relay and a minus locking relay respectively. PTR designates a plus transmitting relay, and MTR a minus transmitting relay.

All of these relays are polarized and have differential windings, the curved lines A to B representing one winding and the curved lines C to D representing the other winding. Each relay is provided with a tongue T actuated by the armature and with a spacing contact S and a marking contact M. A current flowing from A to B or from C to D will cause the tongue T to make contact with stop S, while a current flowing from B to A or from D to C will cause the tongue T to make contact with stop M. Relays LCR, SR, CR, PTR, MTR should be centered so that with no current flowing through the windings their tongues will cling to either contact when so placed. Relays PLR and MLR should be given a magnetic bias so that the normal position of their tongues will be on stop S.

TF designates a vibrating element in the form of a tuning fork. This fork is electrically driven by means of a driving magnet DM and driving contact $C^5$. It is caused to vibrate in the manner of a common bell or buzzer. This form of device is well known and need not be more particularly described herein. Change in the natural period of vibration of the tuning fork may be made by adjusting the movable weights MW to different positions on the tines of the tuning fork. CM designates a corrector magnet which acts magnetically upon the tuning fork. A current through the windings of magnet CM will reduce the amplitude of vibration of the tuning fork and thereby increase the frequency. The flow of current through the corrector magnet is controlled by the corrector relay. The flow of current through magnet CM is intermittent and occurs at irregular intervals and serves to maintain the tuning fork in synchronism with the received signals as will be fully hereinafter described.

One tine of the tuning fork vibrates between and engages corrector contacts $C^3$ and $C^4$. The other tine of the tuning fork engages with, simultaneously, selecting contacts $C^1$ and $C^2$.

It is necessary that the tuning fork TF vibrate in synchronism with the received signal units. For each unit length of signal received over the cable the tuning fork must make one complete cycle of vibration.

The means for maintaining the tuning fork vibrating in synchronism with the line signals is as follows:

The tuning fork must first be adjusted by means of the movable weights MW until it will make slightly less than a complete cycle of vibration for each unit length of received signal when there is no current flowing through the corrector magnet. The corrector magnet when energized must exert a magnetic effect on the tuning fork sufficient to cause the frequency of vibration to be increased so that the tuning fork will make slightly more than a complete cycle of vibration for each unit length of received signal. The result of this arrangement is that when the corrector magnet CM is not energized the tuning fork will vibrate at too low a frequency and when the corrector magnet is energized the tuning fork will vibrate at too high a frequency. An automatically operating correction means causes the corrector magnet CM to become de-energized when the frequency of the tuning fork gets ahead of the received signal units, and also causes the corrector magnet to become energized when the frequency of the tuning fork falls behind the frequency of the line signal units. This automatic correction is accomplished by means controlled and operated by the signal impulses received over the cable, as hereinafter described.

The tongue T of the moving coil receiving relay MCR is connected to the windings of relays LCR, PLR, MLR. The line control relay LCR is given a neutral adjustment so that, with no current through its windings, its tongue T will rest indifferently on either contact S or M. When the tongue T of relay MCR makes contact with stop S the tongue of relay LCR will rest on contact S. When the tongue of relay MCR engages with stop M the tongue of relay LCR will move to contact M. If, now, the tongue of relay MCR should move to a central position and engage with neither contact there will be no current through the windings of relay LCR but the tongue of relay LCR will continue to make contact with its contact M. It will thus be seen that the tongue of relay LCR will move or tend to move when the tongue of relay MCR engages with either contact S or M but will not move when the tongue of relay MCR is in a central position.

The tongue of relay LCR is connected to the windings of relay SR and thence to ground through contact $C^3$ and the tuning fork. Therefore, the relay SR will be under the influence of the tongue of the relay LCR only when the tuning fork is making contact with $C^3$. Another circuit from the tongue T of the relay LCR goes through fixed condenser FC to tongue T of relay SR. The stop S of relay SR is connected to the winding A to B of relay CR and the stop M of relay SR is connected to winding D to C of the corrector relay CR, so that the circuit from tongue T of relay SR will be through one of the windings of relay CR and thence to ground, through contact $C^4$ and the tuning fork. Any current impulse from condenser FC must pass through either one or the other winding of relay CR and the position of the tongue of relay SR determines which winding of relay CR the condenser impulse will go through. When the tuning fork is making connection with contact $C^4$ a positive impulse on terminal A or a negative impulse on terminal D of relay CR will throw the tongue of that relay to the left, but a negative impulse on terminal A or a positive impulse on terminal D of relay CR will throw the tongue of that relay to the right. If the tongue of relay LCR should move from right to left or from left to right at the moment that the tuning fork is making contact with $C^4$ the impulse from condenser FC will throw the tongue of relay CR to the left. Assuming the tuning fork is making contact with $C^4$ when the tongue of LCR moves from right to left, that is from M to S, the tongue of relay SR will remain on its stop M and the impulse from the condenser SC will flow through windings C to D of CR and the tongue of relay CR will move to the left to stop S. When, however, the tongue of relay LCR moves from left to right, from stop S to stop M, the tongue of relay SR will remain on its stop S, and the impulse from the condenser will flow through windings A to B of relay CR and the tongue of said relay CR will be moved or tend to move to stop S. When the tongue of relay LCR moves from right to left or from left to right at the moment that the tuning fork is making contact with $C^3$, then tongue T of relay CR will be thrown to the right due to the condenser impulse from FC just as soon as the fork makes contact with $C^4$. The impulse from the condenser can only take place when the fork is making contact with $C^4$, and the tongue of relay SR moves only when the fork makes contact with $C^3$.

It should be noted that each time tongue T of relay LCR moves from one contact to the other a short impulse from condenser FC will pass through one of the windings of relay CR. If this movement of the tongue of relay LCR should occur when the tuning fork is touching contact $C^4$ then the condenser discharge will immediately occur, and as tongue T of relay SR will not move because the tuning fork is not touching contact $C^3$ the tongue of relay CR will be thrown to stop S by the condenser discharge. If, however, this movement of tongue T of relay LCR should occur when the tuning fork is touching contact $C^3$ the discharge from condenser FC through relay CR will be delayed until the tuning fork touches contact $C^4$, but this movement of tongue T of relay LCR occurring when the tuning fork is making contact with $C^3$ will cause movement of tongue T of relay SR, and the condenser discharge which occurs when the tuning fork touches contact $C^4$ will throw the tongue T of relay CR to the stop M.

It will be evident from the foregoing that for each movement of the tongue of LCR there will be a discharge from condenser FC, and if this movement of the relay LCR occurs when the tuning fork is touching contact $C^3$ the tongue of the switch relay SR will move, so that the condenser discharge throws the tongue of corrector relay CR to stop M, but if this movement of the tongue of the relay LCR should occur when the tuning fork is touching $C^4$ the switch relay SR will not be operated and the condenser discharge will throw the tongue of the corrector relay CR to stop S.

The relay SR acts as a switch relay and switches the condenser discharge through either one or the other of the windings of the relay CR. If the tongue of the relay LCR moves when the tuning fork is touching one of its contacts the relay SR will move and switch the condenser impulse through relay CR so its tongue will move in a certain direction. If the tongue of the relay LCR moves when the tuning fork is touching the other contact the relay SR will fail to move and the condenser impulse will move the tongue of relay CR in the other direction.

When the tongue of corrector relay CR makes contact with M the corrector magnet CM will be energized and the period of vibration of the tuning fork will increase. When the tongue of corrector relay CR leaves contact M, no current will flow through corrector magnet CM and the frequency of vibration of the tuning fork will decrease.

The tongue of the plus locking relay PLR is connected through its own winding D to C to the terminal D of the winding D to C of the plus transmitting relay PTR, the terminal C of said winding being connected to the contact $C^2$ of the tuning fork.

The tongue of the minus locking relay MLR is connected through its own winding D to C to the terminal D of the winding D to C of the minus transmitting relay MTR, the terminal C of said winding being connected to the contact $C^1$ of the tuning fork.

It should be noted that in their normal positions, the tongues of relays PLR and MLR are resting against their contacts S. The relays may be magnetically biased to secure this condition.

The operation of the apparatus is as follows:

The period of vibration of the tuning fork is set by means of the movable weights MW so that it makes slightly less than a complete cycle of vibration for each unit length of received signal when no current flows through the corrector magnet CM, and makes slightly more than a complete cycle of vibration for each unit length of received signal when current flows through the corrector magnet CM. As hereinbefore pointed out the movement of the tongue of the receiving moving coil relay MCR will be controlled by signal impulses of positive, negative or zero current value. Assuming no distortion of the signals in transmission the tongue T of relay MCR will make contact with its stops S and M at unit or multiple unit time intervals. The instant of movement of the tongue of relay LCR is controlled by relay MCR. If the vibration of the tuning fork is in such phase relation with the movements of the tongue of the relay LCR that the tuning fork is making contact with stop $C^4$ at the instant that the tongue of the relay LCR moves to contact S or to the contact M, then the tongue of the relay CR will be moved to its stop S and the corrector magnet CM will be de-energized and the frequency of the tuning fork will be reduced. The phase relation between the tongue of the relay LCR and the tuning fork will now change and within a short period of time the tuning fork will be making contact with $C^3$ at the instant that the tongue of the relay LCR makes contact with its stop either S or M. The tongue of the corrector relay CR will now be moved to its stop M and the corrector magnet will be energized, whereby the frequency of vibration of the tuning fork will be increased. The tuning fork will be thus maintained in synchronism and in approximate phase relation with the received signals. In actual operation tongue T of relay LCR will be in transit between its contacts S or M when the tuning fork is about to leave contact $C^3$, is in transit between stops $C^3$ and $C^4$, or is just making contact with stop $C^4$. If the received signals are mutilated so that they are shortened or lengthened as compared with the signals sent out by the transmitting station and, therefore, the tongue of relay LCR does not move at exactly unit or multiple unit intervals, there will be a speeding up and slowing down of the frequency of vibration of the tuning fork, but since the speeding up and slowing down effect on the tuning fork due to corrector magnet CM is quite small and must persist for a considerable time before the vibration of the tuning fork can get far out of relative phase relation with the received signals, this system of holding the tuning fork in step with the received cable signals is very effective even though the received cable signals are considerably distorted.

When the correcting system is holding the tuning fork in step with the received unit signal lengths it will be noted that the tuning fork will make contact with $C^1$ and $C^2$, simultaneously, once for each unit length of received signal.

The circuit from the tongue of relay MCR goes through the winding of relay LCR, through one winding of relay PLR from A to B and thence through one winding of relay MLR from B to A. As previously explained, if the tongue of relay MCR is in a central position the tongues of relays PLR and MLR will rest on their contacts S. If the tongue of relay MCR makes contact with stop S, the tongue of relay PLR will move to contact M. The tongue of relay MLR will remain on stop S. If, however, the tongue of relay MCR makes contact with stop M, the tongue of relay MLR will move to contact M, while the tongue of relay PLR will be on stop S.

Each time the tuning fork makes contact with $C^1$ and $C^2$, one circuit will be completed from the tongue T of relay PLR through its own winding and through one winding of relay PTR to the tuning fork, and another circuit from the tongue T of relay MLR through its own winding and through one winding of relay MTR to the tuning fork. The current through the D to C windings of relays PLR and MLR is of greater value than the currents through the other windings and the direction of the current is such that it tends to hold the tongues of those relays to whichever contact they may be touching. When the tuning fork is not touching contact $C^1$ and $C^2$ the relays PLR and MLR will be under the influence of the relay MCR. When the tuning fork engages with contacts $C^1$ and $C^2$ the tongues of relays PLR and MLR will be locked up and the current through the D to C windings of relays PTR and MTR will cause the tongue of relay PTR to assume the position of the tongue of relay PLR, and also cause the tongue of relay MTR to assume the position of the tongue of relay MLR. This method of locking up the tongues of relays PLR and MLR insures that there will be no movement of the tongues of relays PLR and MLR during the time that the plus and minus transmitting relays PTR and MTR are connected to them, and the tongues of relays PTR and MTR will move only at unit time intervals, the instant that they move being defined by the moment of contact of the tuning fork with $C^1$ and $C^2$.

The contacts and tongues of relays PTR and MTR are connected to the cable battery CB and ground, and to the cable into which it is desired to repeat the signals, in such manner that if both relay tongues are on stops S the cable will be grounded. If now the tongue of relay PTR is moved to stop M the positive terminal of the battery will be applied to the cable, but had the tongue of relay MTR been moved the negative terminal of the battery would have been applied to the cable. During the time that the tuning fork is not making contact with $C^1$ and $C^2$ there will be no current flowing through the D to C windings of relays PTR and MTR and any jar or vibration might cause their tongues to break connection with their contacts. Resistances $P^1$ and $P^2$ are bridged across the battery CB and, from the neutral point of this potentiometer, circuits lead to the B terminals of relays PTR and MTR and thence to their respective tongues. The small current in these circuits flows through the B to A windings of relays PTR and MTR in such direction as to hold their tongues firmly to whichever contact they are touching. This current is of small value and does not interfere with the normal operation of the relays but merely insures that the relays make firm contact during the time there is no current through their operating windings D to C.

It is understood that the apparatus herein described will correct any distortion in signals that is less than one-half a complete unit. If the distortion of the signal is greater than one-half a unit period, so that the signal impulse will be maintained beyond the moment of contact of the tuning fork with C¹ and C² which, in the normal operation of the signal, should show a change in the position of the tongue of the relay MCR and the tongues of relays PLR and MLR, then the distortion in the signal will persist for a full unit period until the next contact of the tuning fork with C¹ and C². The moment of contact of the tuning fork with contacts C¹ and C² marks the signal unit periods so that the signal impulses sent out through the transmitting relays will be defined by the vibration of the tuning fork and its contacts C¹ and C².

No adjustable means is provided to insure that the tuning fork will make contact with C¹ and C² at the proper moment with respect to the received signals, for experience has proven that this adjustable means is unnecessary on a repeater of this type.

The correction of the distortion of the signals is accomplished by the tuning fork through its cooperation with the relays PLR and MLR and with the transmitting relays PTR and MTR. To bring about this correction of the distortion in the signals it is only necessary that the tuning fork shall vibrate in synchronism with the incoming signals of unit length.

While the largest application of this repeater will probably be on submarine cables its use is by no means limited to that application and it may be used to repeat signals on land lines or other signalling systems where a signalling code having positive, negative and zero current intervals is used; and it may also be used to repeat signals from a land line into a sumbarine cable and vice-versa.

What I claim is:

1. A cable telegraph repeater system wherein the signals received and transmitted are of positive, negative or zero current value, comprising a signal receiving apparatus adapted to be operated by the received signal impulses, a signal transmitting apparatus, means whereby the signal receiving apparatus will cause the transmitting apparatus to transmit signals of unit or multiple-unit length said means being interposed between and in circuit with the receiving apparatus and the transmitting apparatus, and means whereby the signal receiving apparatus will cause the transmitting apparatus to transmit signals of positive, negative or zero current value in response to received signals of corresponding current value said means being interposed between and in circuit with the receiving apparatus and the transmitting apparatus.

2. A cable telegraph repeater system wherein the signals received and transmitted are of positive, negative or zero current value, comprising a signal receiving apparatus adapted to be operated by the received signal impulses, two transmitting relays, means whereby the signal receiving apparatus will cause the two transmitting relays to transmit signals of unit or multiple-unit length said means being interposed between and in circuit with the receiving apparatus and the transmitting apparatus, and means whereby the signal receiving apparatus will cause the two transmitting relays to transmit signals of positive, negative or zero current value in response to received signals of corresponding current value said means being interposed between and in circuit with the receiving apparatus and the transmitting apparatus.

3. A cable telegraph repeater system wherein the signals received and transmitted are of unit or multiple-unit length of positive, negative or zero current value, a signal receiving apparatus adapted to be operated by the received signal impulses, a signal transmitting apparatus, a vibrating element, means whereby the signal receiving apparatus and the vibrating element will cause the transmitting apparatus to transmit signals of unit or multiple-unit length said means being interposed between and in circuit with the receiving apparatus and the transmitting apparatus, and means whereby the signal receiving apparatus will cause the transmitting apparatus to transmit signals of positive, negative or zero current value in response to received signals of corresponding current value said means being interposed between and in circuit with the receiving apparatus and the transmitting apparatus, the unit length of the signals transmitted by the transmitting apparatus being controlled by the signal receiving apparatus and the vibrating element.

4. A cable telegraph system wherein the signals transmitted are of unit length or multiple unit length of positive, negative or zero current value, comprising a signal receiving apparatus, two transmitting relays, a vibrating element, means whereby the signal receiving apparatus and the vibrating element will cause the two transmitting relays to transmit signals of unit or multiple unit length, and means whereby the signal receiving apparatus will cause the two transmitting relays to transmit signals of positive, negative or zero current value in response to received signals of corresponding current value, the unit length of the signals transmitted by the said two relays being controlled by the signal receiving apparatus and the vibrating element.

5. A cable telegraph system wherein the signals transmitted are of unit or multiple unit length of positive, negative or zero current value, comprising a signal receiving apparatus, a signal transmitting apparatus, a vibrating element, means whereby the signal receiving apparatus and the vibrating element will cause the transmitting apparatus to transmit signals of unit or multiple unit length, means whereby the signal receiving apparatus will cause the transmitting apparatus to transmit signals of positive, negative or zero current value in response to received signals of corresponding current value, the unit length of the signals transmitted by the transmitting apparatus being controlled by the signal receiving apparatus and the vibrating element, and means for maintaining the vibrating element in synchronism with the units of the received signals.

6. A cable telegraph system wherein the signals transmitted are of unit length or multiple unit length of positive, negative or zero current value, comprising a signal receiving apparatus, two transmitting relays, a vibrating element, means whereby the signal receiving apparatus and the vibrating element will cause the two transmitting relays to transmit signals of unit or multiple unit length, means whereby the signal receiving apparatus will cause the two transmitting relays to transmit signals of positive, negative or zero current value in response to received signals of corresponding current value, the unit length of the signals transmitted by the said two relays being controlled by the signal receiving apparatus and the vibrating element, and means for maintaining the vibrating element in synchronism with the units of the received signals.

7. A cable telegraph system wherein the signals transmitted are of positive, negative or zero current value, comprising a signal receiving apparatus, two transmitting relays, a vibrating element, means whereby the signal receiving apparatus and the vibrating element will cause the two transmitting relays to transmit signals, means whereby the signal receiving apparatus will cause the two transmitting relays to transmit signals of positive, negative or zero current value in response to received signals of corresponding current value, the length of the signals transmitted by the said two relays being controlled by the signal receiving apparatus and the vibrating element, and means automatically controlled by the signal receiving apparatus and the vibrating element for maintaining the vibrating element in synchronism with the received signals.

8. A regenerative vibratory repeater apparatus for cable telegraph systems wherein the signals transmitted are of positive, negative or zero current value, comprising a receiving relay to receive the signals transmitted from the distant transmitting station, a line control relay operated by the receiving relay, a vibrating tuning fork having two arms, one arm vibrating between two contacts $C^3$—$C^4$, the other arm vibrating between contact $C^5$ and two contacts $C^1$—$C^2$, a driving magnet for the tuning fork having its coil electrically connected to contact $C^5$, two transmitting relays electrically connected to the out-going circuit, one of said relays transmitting plus current impulses and the other transmitting minus current impulses, and both of said relays operating to connect the out-going circuit to ground when the receiving relay tongue is in neutral or zero position, a plus locking relay electrically connected to one coil of the plus transmitting relay, a minus locking relay electrically connected to one coil of the minus transmitting relay, the plus locking relay and the minus locking relay being electrically connected to the line control relay whereby impulses of current through the coils of the line control relay will move the tongues of the locking relays in opposite directions the tongues of the locking relays having a magnetic bias to hold them against one of their stops when the receiving relay is in neutral or zero position, a switch relay having its coils connected to the line control relay and to the contact $C^3$, a corrector relay having its coils connected to the stops of the switch relay and to the contact $C^4$, a corrector magnet arranged to operate on the vibrating element and controlled by the movements of the tongue of the corrector relay, an electrical connection including a fixed condenser between the tongues of the line control relay and the switch relay, electrical connections between the coils of the plus transmitting relay and the minus transmitting relay and the contacts $C^1$—$C^2$, and means whereby when the tongues of the locking relays are moved by their magnetic bias the plus and minus transmitting relays will place the out-going circuit direct to ground for zero signal impulses.

9. A regenerative vibratory repeater apparatus for cable telegraph systems wherein the signals transmitted are of positive, negative or zero current value, comprising a receiving relay to receive the signals transmitted from the distant transmitting station, a line control relay operated by the receiving relay, a vibrating tuning fork, a driving magnet for the tuning fork, two transmitting relays electrically connected to the out-going circuit, one of said relays transmitting plus current impulses and the other transmitting minus current impulses, and both of said relays operating to connect the out-going circuit to ground when the receiving relay tongue is in neutral or zero position, a plus locking relay electrically connected to one coil of the plus transmitting relay, a minus locking relay electrically connected to one coil of the minus transmitting relay, the plus locking relay and the minus locking relay being electrically connected to the line control relay whereby impulses of current through the coils of the line control relay will move the tongues of the locking relays in opposite directions, the tongues of the locking relays having a magnetic bias to hold them against one of their stops when the receiving relay is in neutral or zero position, a switch relay having its coils connected to the line control relay, a corrector relay having its coils connected to the stops of the switch relay, a corrector magnet arranged to operate on the vibrating element and controlled by the movements of the tongue of the corrector relay, an electrical connection including a condenser between the line control relay and the switch relay, electrical connections between the coils of the plus transmitting relay and the minus transmitting relay and the contacts of the said tuning fork, means whereby when the tongues of the locking relays are moved by their magnetic bias the plus and minus transmitting relays will place the out-going circuit direct to ground for zero signal impulses.

10. A regenerative vibratory repeater apparatus for cable telegraph systems wherein the signals transmitted are of positive, negative or zero current value, comprising a receiving relay to receive the signals transmitted from the distant transmitting station, a line control relay operated by the receiving relay, a vibrating tuning fork, two transmitting relays electrically connected to the outgoing circuit, one of said relays transmitting plus current impulses and the other transmitting minus current impulses, and both of said relays operating to connect the out-going circuit to ground when the receiving relay tongue is in neutral or zero position, a plus locking relay electrically connected to one coil of the plus transmitting relay, a minus locking relay electrically connected to one coil of the minus transmitting relay, the plus locking relay and the minus locking relay being electrically connected to the line control relay whereby impulses of current through the coils of the line control relay will move the tongues of the locking relays in opposite directions, the tongues of the locking relays having a magnetic bias to hold them against one of their stops when the receiving relay is in neutral or zero position, electrical connections between the coils of the plus transmitting relay and the minus transmitting relay, means whereby when the tongues of the locking relays are moved by their magnetic bias the plus and minus transmitting relays will place the out-going circuit direct to ground for zero signal impulses, and means whereby the line control relay and the vibrating tuning fork will cause the transmitting relays to transmit signals of unit or multiple unit length.

11. A regenerative vibratory repeater apparatus for cable telegraph systems wherein the signals transmitted are of unit length or multiple unit length of positive, negative or zero current value, comprising a receiving relay to receive the signals transmitted from the distant transmitting station, a line control relay operated by the receiving relay, a vibrating tuning fork, two transmitting relays electrically connected to the outgoing circuit, one of said relays transmitting plus current impulses and the other transmitting minus current impulses, and both of said relays operating to connect the out-going circuit to ground when the receiving relay tongue is in neutral or zero position, a plus locking relay electrically connected to one coil of the plus transmitting relay, a minus locking relay electrically connected to one coil of the minus transmitting relay, the plus locking relay and the minus locking relay being electrically connected to the line control relay whereby impulses of current through the coils of the line control relay will move the tongues of the locking relays in opposite directions, the tongues of the locking relays having a magnetic bias to hold them against one of their stops when the receiving relay is in neutral or zero position, electrical connections between the coils of the plus transmitting relay and the minus transmitting relay, means whereby when the tongues of the locking relays are moved by their magnetic bias the plus and minus transmitting relays will place the out-going circuit direct to ground for zero signal impulses, and means whereby the line control relay and the vibrating tuning fork will cause the transmitting relays to transmit signals of unit or multiple unit length.

12. A regenerative vibratory repeater apparatus for cable telegraph systems wherein the signals transmitted are of unit length or multiple unit length of positive, negative or zero current value, comprising a receiving relay to receive the signals transmitted from the distant transmitting station, a vibrating tuning fork, two transmitting relays electrically connected to the out-going circuit, one of said relays transmitting plus current impulses and the other transmitting minus current impulses, and both of said relays operating to connect the out-going circuit to ground when the receiving relay tongue is in neutral or zero position, a plus locking relay electrically connected to one coil of the plus transmitting relay, a minus locking relay electrically connected to one coil of the minus transmitting relay, the plus locking relay and the minus locking relay being electrically controlled by the receiving relay whereby impulses of current through the coils of the receiving relay will move the tongues of the locking relays in opposite directions, the tongues of the locking relays having a magnetic bias to hold them against one of their stops when the receiving relay is in neutral or zero position, electrical connections between the coils of the plus transmitting relay and the minus transmitting relay, means whereby when the tongues of the locking relays are moved by their magnetic bias the plus and minus transmitting relays will place the out-going circuit direct to ground for zero signal impulses, and means whereby the line control relay and the vibrating tuning fork will cause the transmitting relays to transmit signals of unit or multiple unit length.

In testimony whereof I hereunto affix my signature.

ALDER F. CONNERY.